US011079063B2

(12) United States Patent
Shehab et al.

(10) Patent No.: US 11,079,063 B2
(45) Date of Patent: Aug. 3, 2021

(54) ZERO-G LIFT ASSIST DEVICE

(71) Applicants: The Boeing Company, Chicago, IL (US); University of Washington, Seattle, WA (US)

(72) Inventors: Kareem Shehab, Seattle, WA (US); Donald W. Coffland, Seattle, WA (US); Alexander de Marne, Seattle, WA (US); W. Tony Piaskowy, Seattle, WA (US); Cameron Fasola, Seattle, WA (US); Lance O. McCann, Seattle, WA (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 16/406,126

(22) Filed: May 8, 2019

(65) Prior Publication Data

US 2020/0355316 A1    Nov. 12, 2020

(51) Int. Cl.
| *F16M 11/00* | (2006.01) |
| *F16M 11/18* | (2006.01) |
| *F16M 11/04* | (2006.01) |
| *B64F 5/10* | (2017.01) |
| *G05D 13/62* | (2006.01) |
| *G01L 5/00* | (2006.01) |
| *G01G 19/08* | (2006.01) |
| *G05D 15/01* | (2006.01) |
| *B66F 3/10* | (2006.01) |

(52) U.S. Cl.
CPC ............... *F16M 11/18* (2013.01); *B64F 5/10* (2017.01); *B66F 3/10* (2013.01); *F16M 11/046* (2013.01); *G01G 19/083* (2013.01); *G01L 5/0038* (2013.01); *G05D 13/62* (2013.01); *G05D 15/01* (2013.01)

(58) Field of Classification Search
CPC .... B25H 1/0007; F16M 11/04; F16M 11/046; F16M 11/05; F16M 11/42; F16M 11/18; B64F 5/10; B66F 3/10; G01G 19/083; G01G 5/0038; G05D 13/62
See application file for complete search history.

(56) References Cited

U.S. PATENT DOCUMENTS

| 6,659,428 | B2 * | 12/2003 | Kubota | B66F 3/10 254/100 |
| 7,810,793 | B1 * | 10/2010 | Chiang | B66F 3/10 254/397 |
| 2002/0116881 | A1 * | 8/2002 | Zimmerman | B66F 3/10 52/126.6 |
| 2014/0054522 | A1 * | 2/2014 | Panzer | B66F 3/10 254/98 |
| 2020/0048056 | A1 * | 2/2020 | Bush | B66F 3/08 |

* cited by examiner

Primary Examiner — Amy J. Sterling
(74) Attorney, Agent, or Firm — Coats & Bennett, PLLC

(57) ABSTRACT

Apparatuses, systems, and methods are disclosed for providing a zero-G condition to a part to assist in allowing an operator to weightlessly move a part and assist an operator in the installation of a part into an assembly. Present methods, systems, and apparatuses further provide a zero-G lift able to alter the lift velocity of a part, from first predetermined velocity to a second predetermined velocity.

30 Claims, 9 Drawing Sheets

ZERO-G LIFT ASSIST DEVICE

TECHNOLOGICAL FIELD

The present disclosure relates generally to the field of positioning apparatuses and systems, as well as methods for positioning a part during part installation, modification, rework removal, etc. More specifically, the present disclosure relates to positioning apparatuses and systems comprising a gravity compensation device, system, and methods for compensating gravitational forces of a part during part installation, modification, rework removal, etc.

BACKGROUND

Compensating for gravitational forces during the positioning of an object, including, for example, a tool or other larger object is advantageous as the object observes a state of relative weightlessness. This makes the object easier for an operator to move and manipulate. The compensation of gravitational forces by using a gravity compensation device insures that the force necessary to support an object is shifted from an operator to the device. Gravity compensation devices that suspend an object and exert upward forces on the object to counter the downward gravitational forces on such object, such as, for example, a tool, allow the operator to manipulate the tool with significantly less effort.

Unfortunately, positioning a heavy object accurately when space is a concern remains a challenge. When a heavy part is, for example, to be installed into a larger assembly that requires lifting or ascending the part into a temporary and/or final position, so-called "zero-G" assisting devices that, for example, ordinarily suspend and then lower a part or other object into position are not useful.

SUMMARY

According to a presently disclosed aspect, a method is disclosed including supporting a part onto a zero-G positioning device, such that the part exerts a downward force on the zero-G positioning device, and with the zero-G positioning device comprising: a weight measurement mechanism in communication with the part and further in communication with a support; a force sensor in communication with the support; a controller in communication with the force sensor, and the controller further in communication with the weight measurement mechanism; a drive mechanism in communication with the controller, and the drive mechanism further in communication with the force sensor. The method further includes providing a countering force to the part; establishing a zero-G condition on the part; applying a directional force relative to the part; sensing the directional force applied to the part; generating a directional force signal; delivering the directional force signal to a controller; actuating the drive mechanism; and moving the part at a first predetermined velocity in the direction of the directional force.

According to another aspect, a method further includes terminating the directional force applied relative to the part; sensing terminating the force; terminating the force signal; terminating movement of the drive mechanism; and terminating movement of the part.

According to further aspects, the directional force applied to the zero-G positioning device is an upward force.

According to further aspects, the directional force applied to the zero-G positioning device is a downward force.

According to further aspects, the directional force applied to the zero-G positioning device is a rotational force, equivalently referred to herein as "torque".

In a further aspect, a method is disclosed including sensing a part location relative to an installation location; generating a part location signal corresponding to a location of the part relative to the installation location, sending the part location signal to a controller, with the controller configured to control the drive mechanism; and altering the velocity of the drive mechanism (and, in turn, the velocity of the part) from a first predetermined rate or velocity to a second predetermined rate or velocity.

In another aspect, an apparatus is disclosed, with the apparatus including a support configured to support a part; a weight load measurement mechanism configured to sense the presence a load, such as a part, with the weight load measurement mechanism in communication with the support; a force sensor in communication with the support; and a controller in communication with the force sensor. The controller is further in communication with the weight load measurement mechanism, and a drive mechanism is in communication with the controller, and wherein the weight measurement mechanism sends a signal to the actuator such that the drive mechanism is configured to provide a countering force to the part, and the drive mechanism is configured to move the part in response to the presence of the directional force.

In another aspect, the apparatus establishes a countering force to the weight of the part, and wherein the countering force establishes a zero G condition on the part.

In a further aspect, the apparatus further includes a position sensor configured to sense the position of the part relative to an installation location, with the position sensor in communication with the controller, and said position sensor configured to send a signal to the controller.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
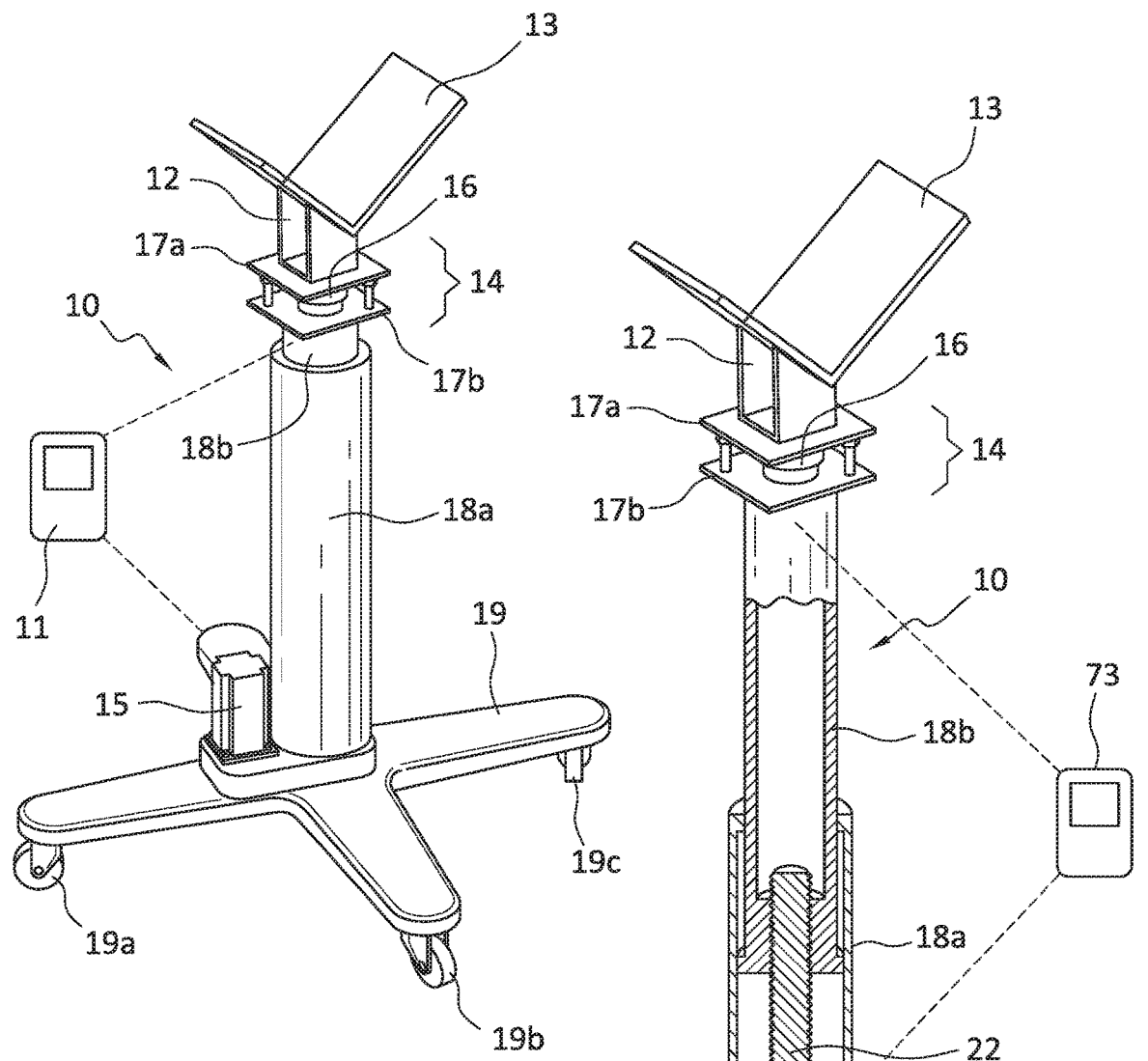
Figure 2:
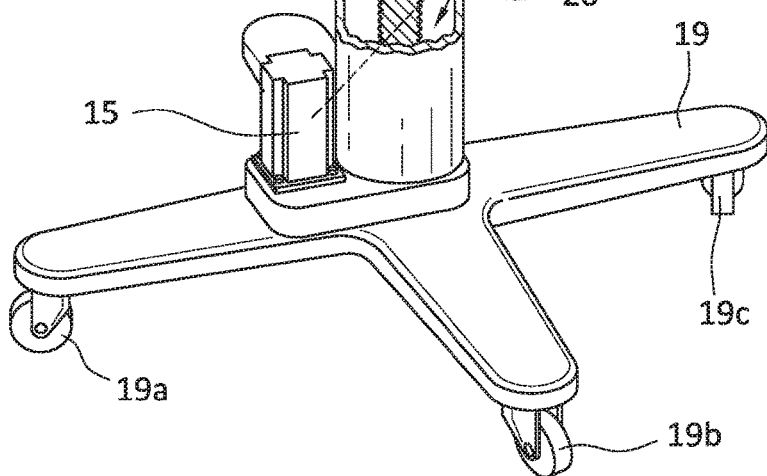
Figure 3:
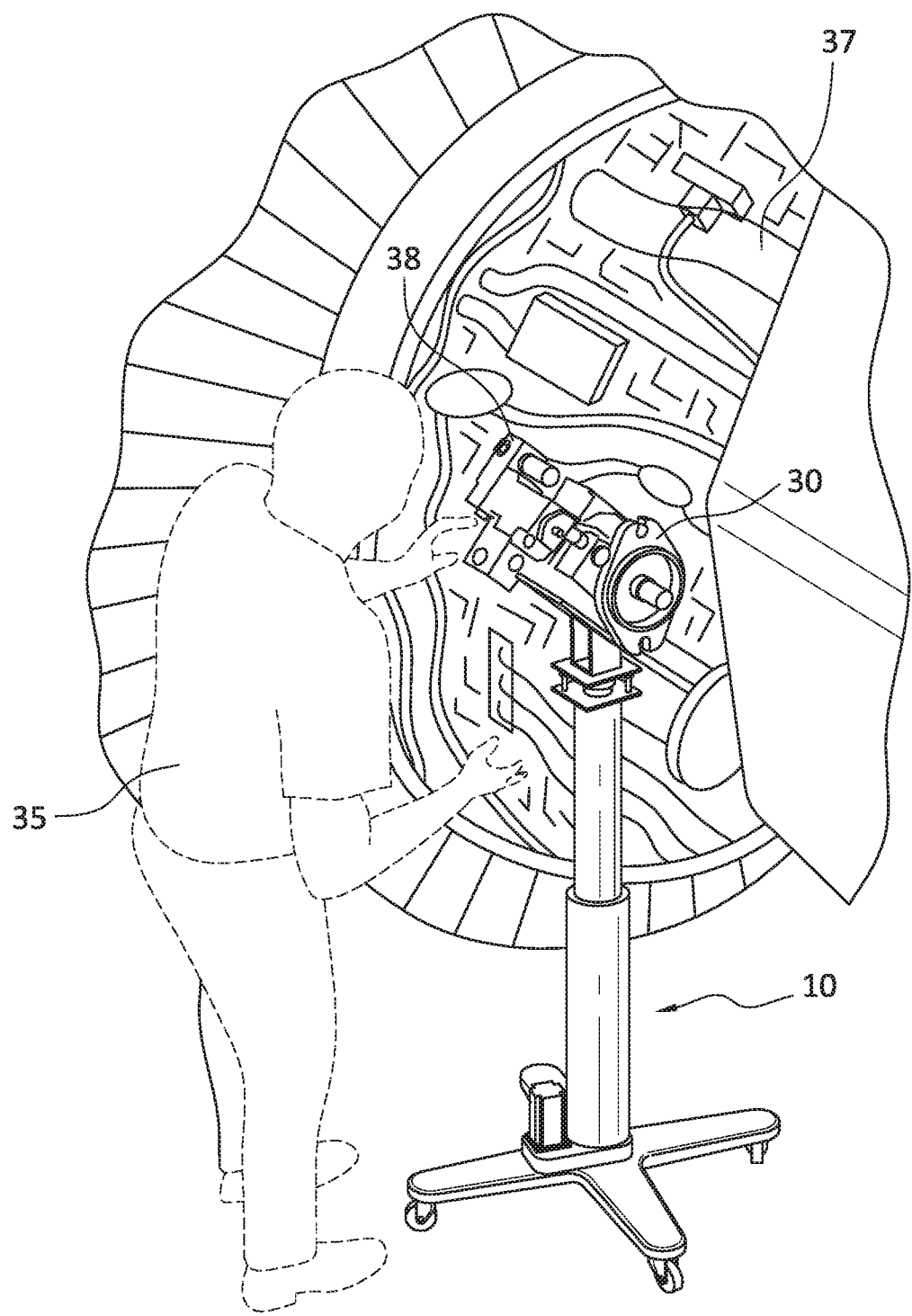
Figure 4:
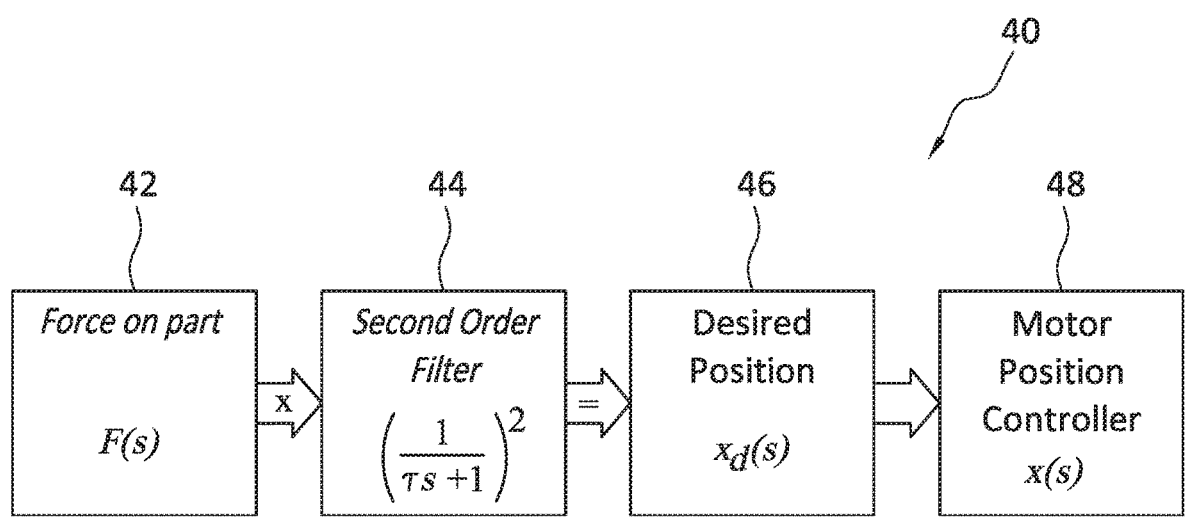
Figure 5:
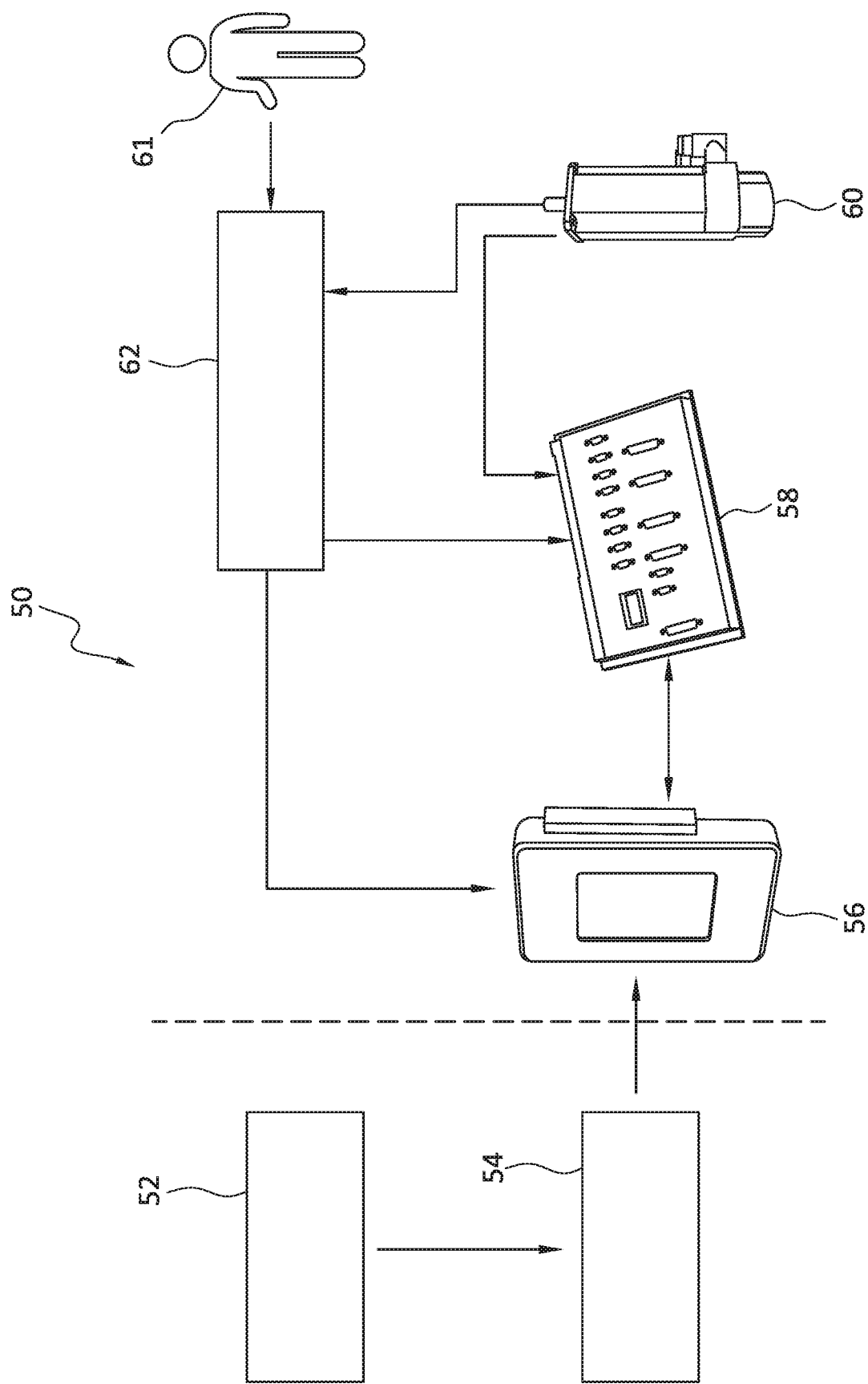
Figure 6:
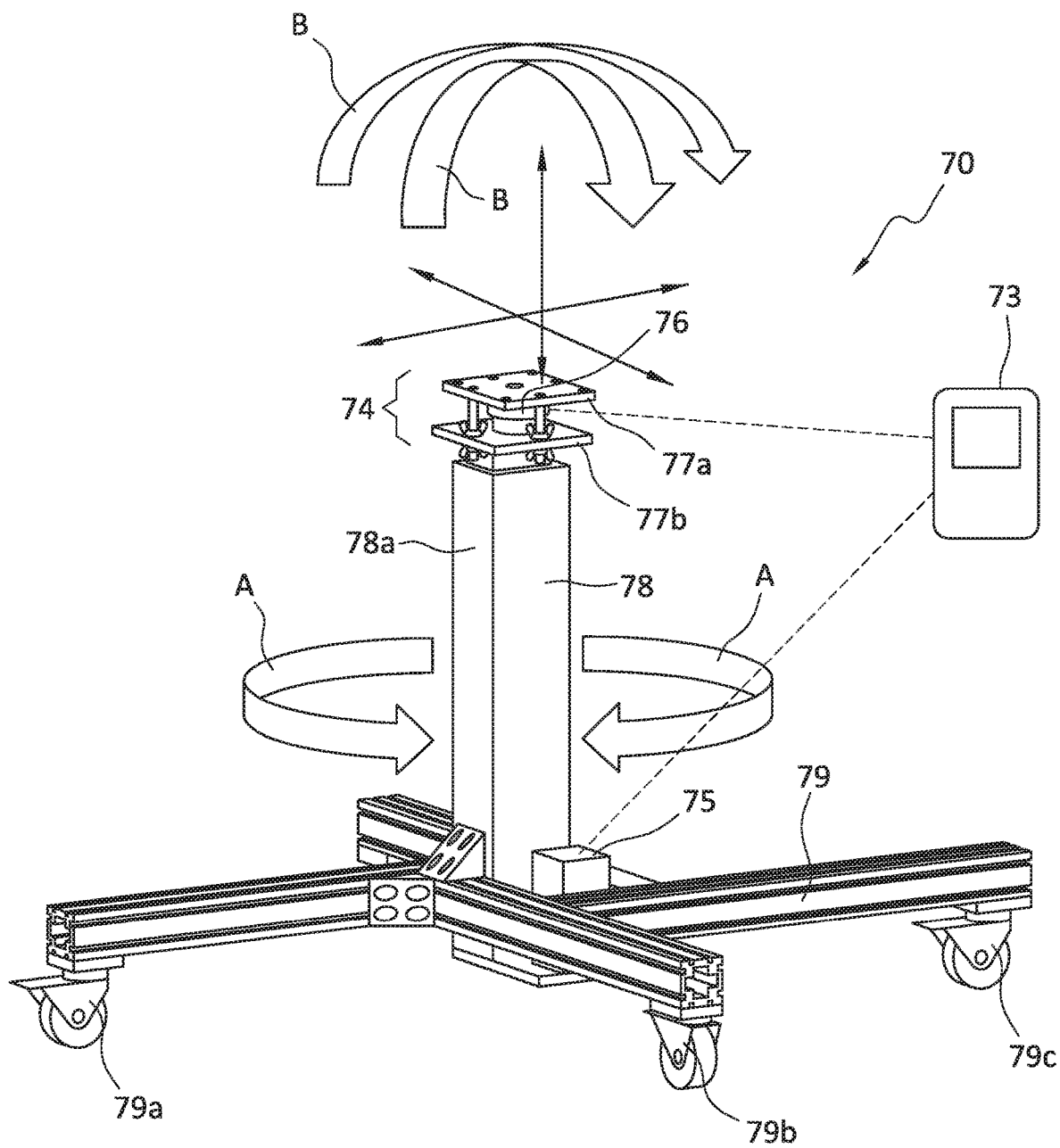
Figure 7:
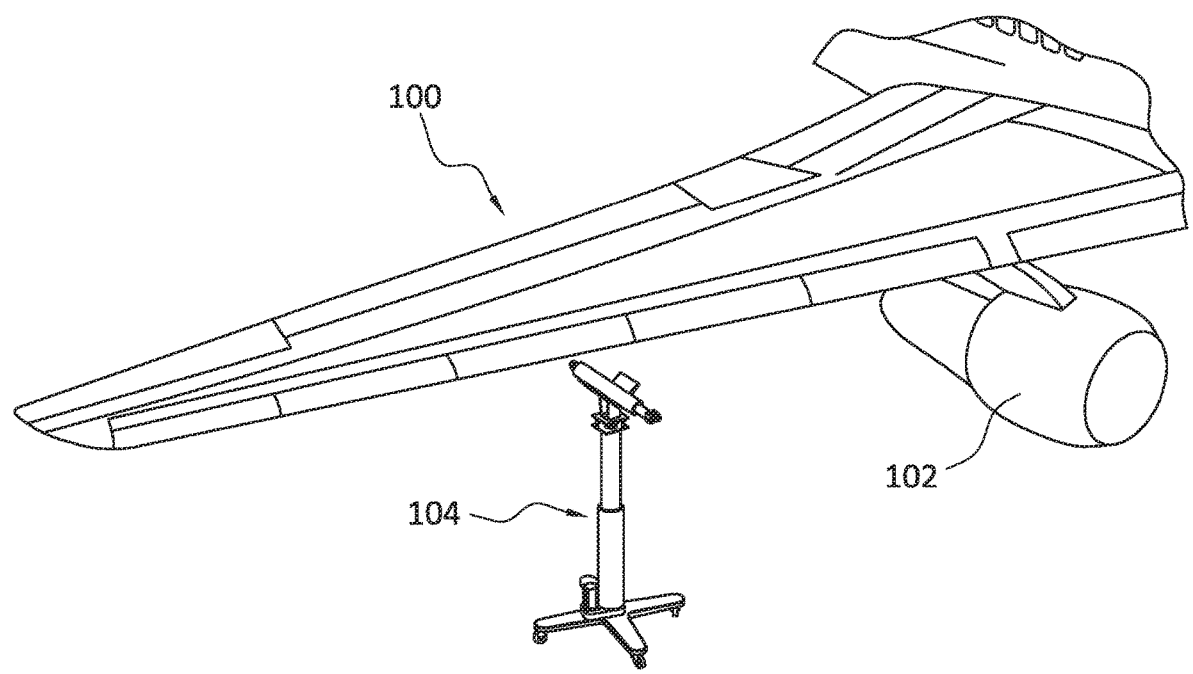
Figure 8:
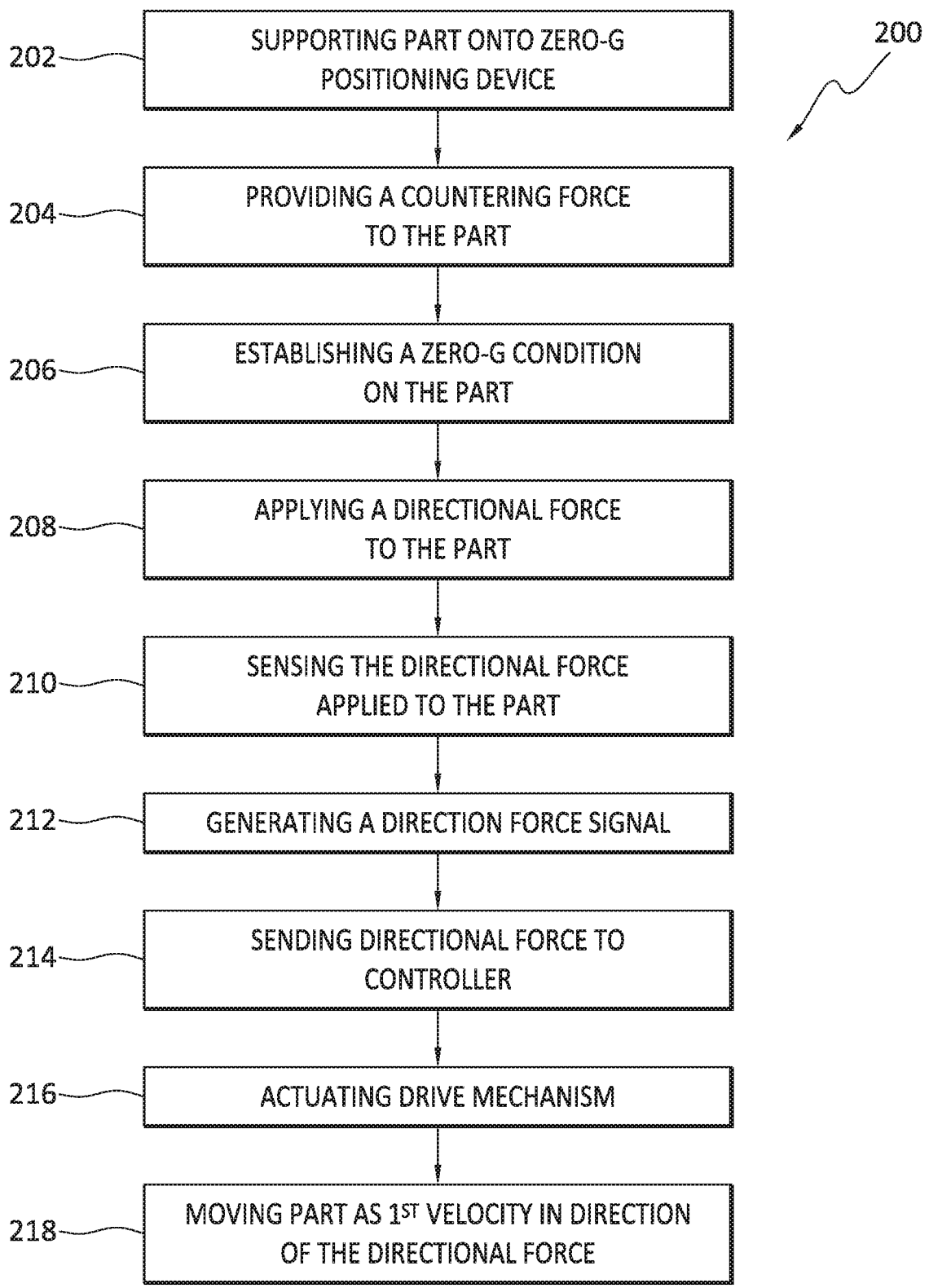
Figure 9:
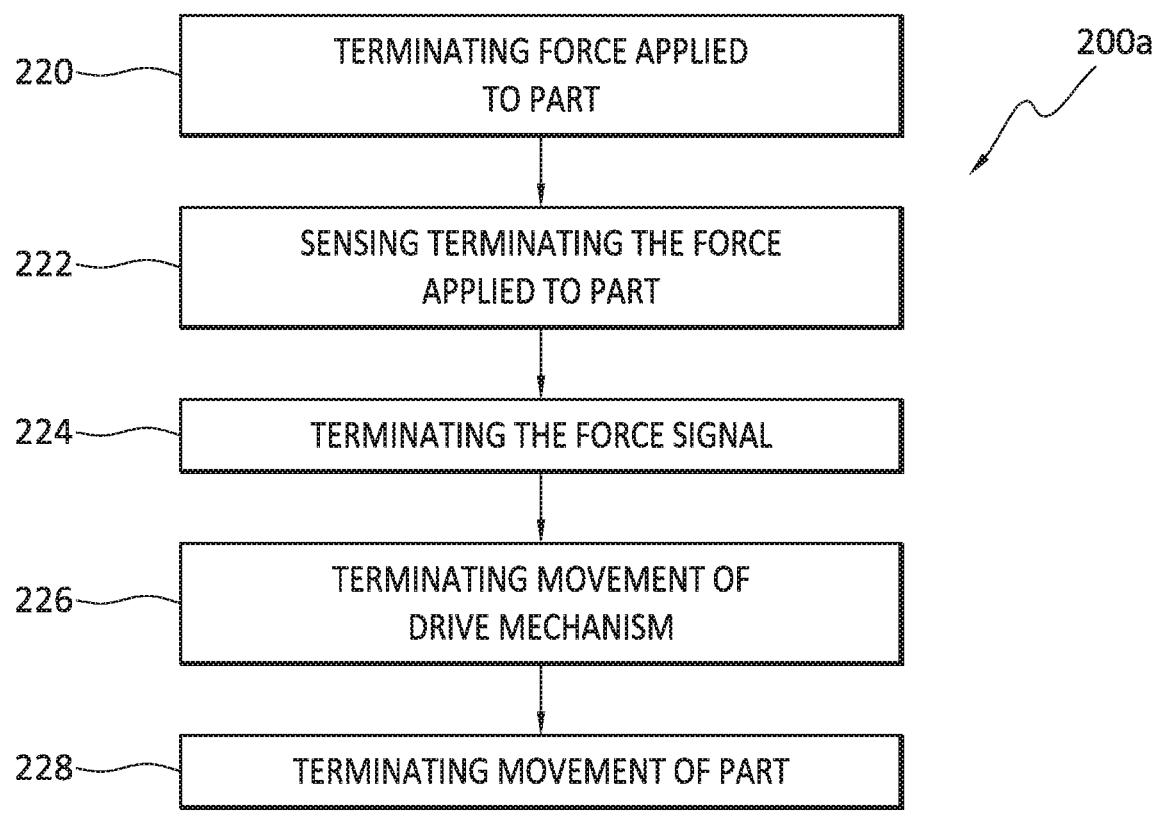
Figure 10:
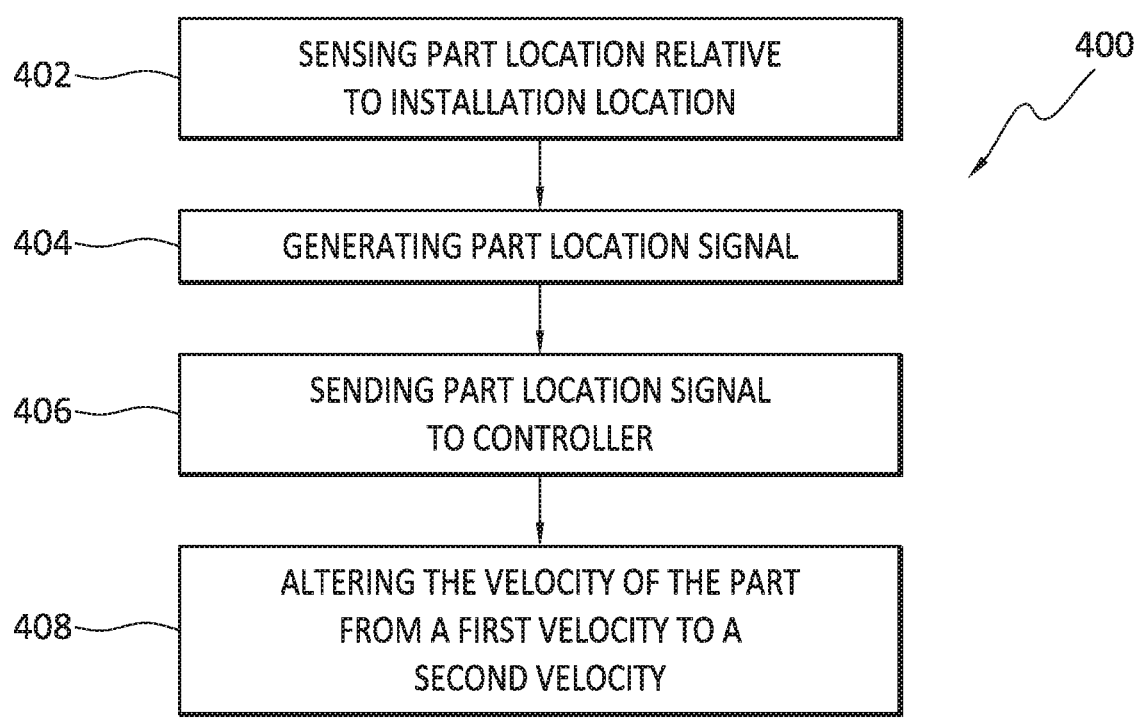

Having thus described variations of the disclosure in general terms, reference will now be made to the accompanying drawings, which are not necessarily drawn to scale, and wherein:

FIG. 1 is an illustration of an apparatus according to an aspect of the present disclosure;

FIG. 2 is an enlarged, partial cross-sectional view of the apparatus of FIG. 1 according to an aspect of the present disclosure;

FIG. 3 is an illustration of the apparatus shown in one or more of FIGS. 1 and 2 according to further aspects of the present disclosure;

FIG. 4 is a non-limiting illustrative diagram of a system for operating the apparatuses shown in any of FIGS. 1-3 according to an aspect of the present disclosure;

FIG. 5 is a non-limiting illustrative diagram of a system for operating the apparatuses shown in any of FIGS. 1-4 according to an aspect of the present disclosure;

FIG. 6 is further illustration of the apparatus of FIG. 1. Illustrating additional ranges of motion according to an aspect of the present disclosure;

FIG. 7 is a perspective view of the apparatus of any of FIGS. 1, 2, 3, and 4 in position relative to an underside of an aircraft wing;

FIG. 8 is a flowchart outlining a method according to an aspect of the present disclosure;

FIG. 9 is a flowchart outlining a method according to an aspect of the present disclosure; and FIG. 10 is flowchart outlining a method according to an aspect of the present disclosure.

DETAILED DESCRIPTION

According to present aspects, apparatuses, systems and methods are disclosed for supporting, maneuvering, positioning and/or installing parts into assemblies, with the parts having significant weight (e.g., parts in excess of 35 lbs.). The force necessary to counter the gravitational force on an object can be significant. When a part is of a particular weight, handling, supporting, etc., such weight and maneuvering the part into an installation position (e.g., into a further assembly, etc.) is time consuming, and can require an inordinate amount of exertion and complex manipulation. Further, situations may arise where a heavy part is maneuvered from a first position to a second or a final position through an ascending orientation (e.g. "lifted" into a predetermined position, etc.). Further situations may require lifting a part, for example, for installation of the part into an assembly, etc., without risking damage to surrounding components that may be already installed into an assembly being manufactured. While a jack-type tool can support and lift an object to a predetermined position, such lifting and support does not render the object gravitationally neutral, or otherwise place the object into a zero-G state without significant operator effort, even if the jack-type device is operated mechanically.

According to present aspects, apparatuses, systems, and methods are disclosed for countering gravitational forces imposed onto sizeable parts to achieve a zero-gravity (referred to equivalently herein as "zero-G") condition on the part for the purpose, for example, of facilitating the handling, supporting, positioning, installing, etc. of sizeable parts during, for example, installation of such parts into assemblies.

FIG. 1 is a representative view of an apparatus according to present aspects. As shown in FIG. 1, zero-G positioning device 10 (referred to equivalently herein as "zero-G lifting device", when an upward force is applied thereto) includes a support 12 mounted onto, or otherwise in communication with a load measurement mechanism 14. The weight measurement mechanism can be any device that can measure weight of an object placed in contact with the device, and can be thought of as a scale, except that such device is understood to take into account the gravitational force that contributes to the weight of the object place into contact with the device. The term "load measurement mechanism" is used equivalently herein with the term "weight measurement device" and are interchangeable terms. Further, the terms "weight" and "load" when referring to a part are equivalent terms and used interchangeably herein. As shown in FIG. 1, and according to present aspects, the weight measurement device 14 includes a sensor for sensing the weight of an object, such as a part placed onto the cradle 13 of support 12. A force sensor 16 can be incorporated into or can be otherwise in contact, or in communication with first plate 17a and second plate 17b. According to further aspects not shown, the force sensor can be incorporated into or supported by a single plate. As shown in FIG. 1, the force sensor 16 is positioned proximate to and can be fixedly attached to the first plate 17a and/or second plate 17b and a lift assembly that, as shown, includes an outer lift housing section 18a and an inner lift section 18b. The outer lift housing section 18a and an inner lift section 18b are shown in FIG. 1 in a nested orientation. A motor 15 is shown adjoining the base section 19 of apparatus 10, with base section 19 including casters 19a, 19b, 19c that facilitate movement and/or gross positioning of the apparatus 10, etc. As shown in FIG. 1, least one controller 11 is shown in communication with force sensor 16 and motor 15 Controller 11 can be in wireless communication with force sensor 16 and motor 15. Alternately, controller 11 can be integrated into another shown component in FIG. 1; for example, the motor 15, force sensor 16, etc.

FIG. 2 is an enlarged and partial cross-sectional view of zero-G positioning device 10 shown in FIG. 1. As shown in FIG. 2, the outer lift housing section 18a and an inner lift section 18b of apparatus 10 are shown in a cooperative and telescoping fashion with inner lift section 18b. shown extending in an upward fashion from outer lift housing section 18a. A partially shown drive mechanism 20 includes a screw drive 22 that can be actuated by, for example and as shown in FIG. 2, signals sent to the drive mechanism 20 from controller 11. The remainder of the enumerated elements shown in FIG. 2 are the same as enumerated elements described with respect to FIG. 1 above.

As shown in FIG. 3, the zero-G positioning device 10 of FIGS. 1 and 2 is shown supporting part 30. As the part contacts the cradle 13 of support 12, the weight and gravitational forces imposed on part 30 are sensed by the load measurement device 14 that then send a signal to a controller (not shown in FIG. 3) and the drive mechanism 20 (not shown in FIG. 3) is actuated such that the drive mechanism and screw drive (not shown in FIG. 3) of the zero-G positioning device 10 exerts an upward force that is substantially equal and opposite to the gravitational downward force exerted on the part 30. In addition to providing a support function in holding the part 30 in a stationary orientation for the operator 35, when the operator engages or touches the part, and applies, for example, an upward force to the part, the force sensor 16 that is in communication with or incorporated into second plate 17b senses the upward force provided to the part by the operator, and the force sensor 16 sends a signal to a controller with the controller then sending signals to the motor 15 to actuate drive mechanism 20. The screw drive 22 within the outer lift housing section 18a and inner lift section 18b, is actuated by the drive mechanism 20 to apply an upward force to inner lift section 18b, resulting in the inner lift section 18b telescoping upward. In this way, part 30 ascends toward and arrives at a predetermined and/or desired installation position from a lower initial position. The force applied by the operator to the part to achieve the lifting of the part can be adjusted as desired, with a presently contemplated upward operator force on the second force sensor ranging, for example, up to about 20 N.

According to a further aspect, an operator can apply a variable force to the part during, for example, the duration of the lifting operation. That is, the present systems and apparatuses can lift or otherwise move a part at variable velocities ion accordance with the amount of force that an operator provides or applies to the part. For example, when an operator provides a light upward force to the part, the part will ascend at a predetermined velocity. If the operator increases the upward force on the part, the force sensor will sense the increased upward force and the system and apparatus will respond by lifting the part at a greater velocity. Present aspects contemplate setting a maximum velocity (e.g., acting as a "governor") on the system to keep a maximum velocity within safe operating parameters. According to present aspects, the disclosed methods, systems, and apparatuses can cause the velocity of the movement of the part to respond proportionally (within a predetermined velocity range, bounded by a predetermined upper maximum velocity) to the amount of directional force applied to the part by an operator. When more force is applied, the velocity of the part (as it more in the direction of the directional force) increases substantially simultaneously, and when less directional force is applied to the part, the velocity of the part decreases. In this way, present aspects afford an operator with superior "feel" and control in the movement and positioning of a heavy object during installation, removal, rework, etc. of the heavy object.

According to a present aspect, the upward force applied to the part by the zero-G positioning device 10 via the drive mechanism 20 can produce any practical velocity to safely move a part, for example, from an initial position toward and to a predetermined installation position proximate to an assembly into which, for example, part 30 is to be incorporated. According to a present example, the drive mechanism can move a part that weighs, for example, from about 1 lb. to about 75 lbs. over a distance of about 2.5 ft. in an elapsed time of about 10 seconds. Translated into a velocity, according to present aspects, for a part weighing from about 30 lbs. to about 35 lbs., the apparatus shown in FIGS. 1, 2, and/or 3 can move the part from an initial position at rest to an installation position at a velocity ranging from, for example, about 0.1 ft./sec. to about 0.25 ft./sec.

According to further aspects, the presently disclosed apparatuses, systems, and methods contemplate incorporating a variable speed (velocity) option. For example, if a part at rest is about 2 or 3 feet away from an installation position, as the operator applies a slight upward force to the part that activates the lift sensor, the drive mechanism can be substantially simultaneously activated or actuated to lift the part at a first operating velocity designed to traverse a majority of the distance from the initial part position at rest to the installation position in a reasonably short duration (e.g. an initial velocity, or "first" operating velocity, ranging from, for example, about 0.25 to about 1 ft./sec.). As the part approaches the installation position, and the approaches the assembly, according to present aspects, the drive mechanism can be slowed to a second operating velocity, such that the part can be eased into the installation position, (e.g., at a slower velocity) with care. This second operating velocity can be programmed to override an operator to the extent that the system will "ignore" an amount of force that continues to be provided to the part by an operator as the part approaches its intended destination such as, for example, an installation position at which the part is to be installed into an assembly.

While present aspects contemplate direct contact of an operator with the part to achieve system-assisted movement of the part, according to present alternate aspects, the input device can be equipped with a touchpad, joystick, pushbutton, or any means for activating the input device, such that the input device is activated to send a signal to the controller that, in turn, can send a signal to the motor or to the drive mechanism to alter the velocity as described herein.

For example, as shown in FIG. 3, as part 30 nears an installation position adjacent to, for example, a larger assembly 37, operator 35 can alter the velocity of the part by, for example, engaging an input device to alter the initial velocity and dampen, retard, or otherwise signal the controller to slow the velocity of the lifting operation of the part to a second velocity that is slower than the initial velocity, and that can be, for example, a predetermined second velocity. However, present preferred aspects provide a simplified zero-G lift by allowing an operator to directly engage (e.g., touch) a part needing to be moved, installed, removed, etc., without use of any input devices.

For example, as the part near the installation position, the predetermined second velocity can be an order of magnitude slower than the initial velocity of the lifting operation. That is, for example, if an initial maximum velocity is set to a value that can range from about 0.25 ft./sec. to about 1 ft./sec., the predetermined second velocity can be set to range from about 0.025 t. sec. to about 0.1 ft sec. Accordingly, as the drive is engaged to change from an initial velocity (e.g., an initial predetermined velocity) to a second velocity (e.g., a second predetermined velocity) that is slower than the initial velocity, the part is delivered, or driven, at a slower velocity as the part approaches the predetermined installation position. Once the part arrives at the intended installation position, according to present apparatuses, systems, and methods, the drive mechanism is stopped or terminated, and the predetermined travel distance of the part from an initial position to the installation position is completed.

The present systems, apparatuses, and methods contemplate that once an operator provides a force to the part, the drive mechanism will respond such that movement of the part in response to the force provided to the part is said to occur substantially simultaneously. As used herein, the term "substantially simultaneously" refers to a "lag time" or "response time" of the system of from about 0.01 to about 0.05 seconds from the time a force is perceived and a part representing a "load" then begins to move in response to the perceived/sensed force. That is, a part will begin its ascent within from about 0.01 to about 0.05 seconds from the time an upward force is provided to the part by, for example, an operator. In other words, according to present methods, systems, and apparatuses, a force can be detected or sensed, with signals sent from the force sensor to controllers, actuators, etc., with a drive mechanism then actuated to provide a countering gravitational force to a part, resulting in movement of the part in response to a force provided to the part within a timeframe ranging from about 0.01 to about 0.05 seconds.

In other aspects, the apparatus 10 includes a position sensor 38 that senses the proximity the ascending part to a feature or installation area (equivalently referred to herein as "installation position") of the assembly. When the part nears the vicinity of a feature or installation area of the assembly, the position sensor 38 signals the controller to alter (e.g., "slow" or reduce) the velocity of the drive mechanism to a predetermined second velocity, slowing the ascending velocity of the part, and easing the part, under enhanced control, to the final installation position.

In further aspects, the apparatus can be programmed to alter the initial velocity to the second, slower, velocity based on a distance over which the inner lift section 18b has extended from the apparatus 10. When the preprogrammed distance has been travelled, a signal can be sent to the motor 15 or to a controller in communication with the motor, to alter the speed of the drive mechanism 20, and, in turn, alter the upward velocity of the inner lift section 18b (and, therefore, the upward velocity of the part) from an initial velocity to the slower, predetermined second velocity until the part 30 safely arrives, under enhanced control at the installation position. In this automated, programmed approach, if desired, the drive mechanism operation can be terminated automatically when the part arrives at a desired (e.g., installation) position.

A contemplated non-limiting exemplary general operator protocol for using the apparatuses, systems and methods disclosed herein is presented below for illustrative purposes.

Example

According to a present aspect, a part is loaded into the cradle of the lift apparatus. The operator tares the weight of the part, or the tare of the part is otherwise automatically tared. The lift apparatus is then programmed or can be pre-programmed such that the distance the part is to travel from rest in the cradle to an installation location is known.

The operator engages an input device, such as the second plate comprising the second lift sensor, to begin the lifting cycle. The drive mechanism is engaged into the first operational mode via a signal from the controller and the drive mechanism applies lifting force to the lift mechanism of the lift apparatus as well as to the part, raising the part at a predetermined velocity According to the function of Formula (II), while receiving constant force input, the damping coefficient of the force transfer function is increased as the system approaches the top and/or bottom of the stroke to slow (e.g., dampen) the system. According to this aspect, smooth operation of the system is fostered, while protecting the part put in motion from impacting surrounding assemblies. Limit switches can be used to further limit system movement.

According to this Example the second operating velocity of the lifting mechanism, or second velocity that is slower than the initial operating upward lifting velocity, is achieved by operator input into an input device. In response to the operator's input, the filter's bandwidth is reduced to a slow frequency. When the part is approaching the installation position, according to one aspect, the operator can engage an input device to signal the controller to terminate the operation of the drive mechanism in a fashion to eliminate motion oscillation due to reaction forces generated, for example, by contacting the part now be installed with the assembly into which the part is to be installed. With the part now located in the vicinity of the installation position, the part is installed. Once the part is installed, the operator can release any auxiliary safety or support straps that may have been present pursuant to observed operating safety protocol. According to an aspect, the operator can engage an input device to convey to the system that the part has been installed. The input device then signals the controller to retract the lifting mechanism in a reverse or descending direction, and away from the assembly and the installation position. During the descending traverse, the system will detect that the weight of the part is absent from the cradle (having been installed), and the tare weight will be removed from the system. The apparatus can then be removed from the installation area, preferably by wheeling the device away via the integral casters present on underside of the apparatus' base.

A mathematical representation of the first operational mode is set forth in FIG. 4. As shown in FIG. 4, a first velocity mode 40 includes 42 calculating force on a part; 44 processing data according to a second order filter; 46 calculating for a predetermined position; and configuring the motor position controller. In this mode where a first velocity is achieved, the force is converted by multiplying the force by a second order filter into a predetermined position away from the current location. The drive mechanism's position loop then drives the part to the predetermined location. The filter has a bandwidth related to the cutoff frequency, $f_{cutoff}$, defined according to Formula (I):

$$\tau = \frac{1}{2\pi f_{cutoff}} \quad (I)$$

where $f_{cutoff}$ is frequency at which the filter operates. This bandwidth is lower than the motor position controller bandwidth. In this way, the drive mechanism maintains the predetermined initial velocity as is operating in response to the input signals caused by the continued presence of the operator's hand or fingers detected by the second lift sensor.

According to further aspects, the second predetermined velocity can be implemented or continued without continuous operator input by incorporating a transfer function with a dynamic damping variable. The damping variable is scaled based on the position of the lifting mechanism. The function used to scale the damping coefficient over a stroke of the lifting$^2$ $(Ms^2+\beta s+k)X(s)=F(s)^2$ mechanism is calculated according to formula (II):

$$\beta = \frac{1}{1 + 0.5\cos(6\pi(x-32)^2)} \quad (II)$$

The transfer function presented in Formula (II) can be viewed in stages as present in Formulae (III, IV, V, VI) below. A second order mass spring damper transfer function in the s-domain was used as the starting point (III). This formula (III) was cross-multiplied to arrive at Formula (IV), followed by subtracting to isolate the $Ms^2$ term (V). Formula (V) is divided by Ms2 to arrive at the output position with the input of force, with no derivatives of position that could otherwise present an issue regarding continuous time simulations (VI).

$$\frac{\beta X(s)}{Ms^2} = \frac{1}{Ms^2 + \beta s + k} \quad (III)$$

$$(Ms^2 + \beta s + k)X(s) = F(s) \quad (IV)$$

$$(Ms^2 X(s) = F(s) - kX(s) - \beta sX(s) \quad (V)$$

$$X(s) = \frac{F(s)}{Ms^2} - \frac{kX(s)}{Ms^2} - \frac{\beta X(s)}{Ms^2} \quad (VI)$$

Once the deconstructed transfer function was proven, the system response was calculated and plotted for an applied directional force, representing a human providing a substantially constant lifting force ranging, for example, up to about 20 N, for example. In the initial velocity "mode", such force represents a force sensor reaching a threshold value of a magnitude such as, for example, 10 N substantially over a complete "stroke" or "cycle" of the lift achieved by the lift mechanism of the positioning apparatus.

The control system can incorporate various systems for the purpose of sending and receiving operational signals to initiate, alter the velocity of, and terminate movement of the lifting mechanism, according to present aspects. According to one aspect, the control law can be implemented with programs available from LabVIEW (National Instruments, Austin, Tex.) and industrial controller IC-3172 (National Instruments, Austin, Tex.). The motor that is in communication with the drive mechanism for the drive mechanism in communication with and "controlled by" can be a AKD-P00606-NBEC servo drive (Kollmorgen, Radford, Va.). The force sensor in communication with the controller can be an ATI Force/Torque (ATI F/T) sensor (ATI Industrial Automation, Apex, N.C.).

The communication between the systems can be accommodated over an ethernet via UDP. UDP communication can be selected according to a predetermined speed and operating simplicity. The ATF F/T sensor can output data at a rate of up to 7000 Hz via UPD; a rate that can exceed the demands of present aspects. Without being bound to any particular theory, such capability is thought to facilitate desirable system capabilities including, without limitation, force sampling rates, while, for example, fine tuning the performance of the system. Further UPD datagrams are considered beneficial, as the UPD datagrams do not have handshaking dialogues, that insures data is sent and received in protocol for system optimization, according to present aspect.

FIG. 5 is a flowchart illustrating an approach according to present aspects, where system 50 includes a first software program 52 in communication with a second software program 54 in communication with a input station 56. Instructions are sent from input station 56 (that can be, e.g., a PC, laptop, pad, tablet, smartphone, etc.) to a controller 58. Signals are sent from the controller 58 to actuate drive mechanism 60. Positioning data is sent from the drive mechanism to the controller 58, while the drive mechanism can also report data and otherwise be in communication with force sensor 62. To initiate movement in the presently disclosed lifting apparatuses and according to present aspect, an operator 61 contacts force sensor 62. Force sensor 62 can be a single unit that incorporates one or multiple sensors, or is understood herein to incorporate a first and second sensor or a plurality of sensors (not shown) such that operator 61 engages (e.g., touches, contacts, etc.) force sensor 62 with a directional force that can be manual, in a direction that can be, for example, a downward direction or an upward direction, depending on the predetermined upward or downward movement of a part. For example, as an operator applies a force to the part, force sensor 62 senses the force and sends signals to the software in communication with the input station or directly to the controller 58. Controller 58 sends signals to drive mechanism 60, with drive mechanism in communication with force sensor 62.

While the force sensor in the accompanying FIGs. is shown as being integrated into the physical structure of the zero-G lifting devices that are in direct communication with a part, further aspects contemplate locating such sensors remotely from the apparatus itself. That is, according to further aspects, an operator could possibly use a wireless touchpad device or could wear, carry or engage with an appurtenance remote from the apparatus such as, for example a glove, wand, etc. that incorporates the force sensors, and senses directional movement of an operator. According to such aspects, movement of the operator in a predetermined, for example, upward or downward direction could send force signals to one or more controllers dedicated to actuate and control the drive mechanism in a similar direction (e.g., upward, downward, etc.) that, in turn, could move a part in a desired and predetermined direction, and at a predetermined rate.

While the zero-G condition afforded to heavy objects, parts, etc., according to present aspects, is generally advantageous for moving such objects in a substantially vertical direction, the present apparatuses, systems, and methods further contemplate incorporating any mechanical and software systems, etc., that can conduct, or assist in conducting a more complete range of motion including, but not limited to rotational movement or torque, and angular movement. For example, FIG. 6 is a non-limiting illustration of a representative view according to further present aspects, showing an apparatus similar to that shown in FIGS. 1, 2, and 3. As shown in FIG. 6, zero-G lifting apparatus 70 includes a support (not shown) mounted onto, or otherwise in communication with a weight measurement mechanism 74. The weight measurement mechanism can be any device that can measure weight of an object placed in contact with the device, and can be thought of as a scale, except that such device is understood to take into account the gravitational force that contributes to the weight of the object place into contact with the device. While a cradle/support feature is not shown in FIG. 6, it is understood that such a structure for stably and/or securely holding and/or positioning an object would be incorporated thereon.

As shown in FIG. 6, and according to present aspects, the weight measurement device 74 includes a sensor for sensing the weight of an object, such as a part placed onto the cradle of a support (not shown in FIG. 6). At least one force sensor 76 is incorporated into or is otherwise located proximate to and is in communication with first plate 77a and/or a second plate 77b. Although not shown in FIG. 6, the force sensor 76 can be incorporated into a single plate. As shown in FIG. 6, the force sensor 76 is positioned proximate to and can be fixedly attached to a lift assembly 78 that, as shown, includes an outer lift housing section 78a and an inner lift section (not shown in the retracted position as shown in FIG. 6). The outer lift housing section 78a and an inner lift section are shown in FIG. 6 in a nested orientation, with inner lift section not visible in the retracted position. A motor 75 is shown adjoining the base section 79 of apparatus 70, with base section 79 that includes casters 79a, 79b, 79c. The casters 79a, 79b, 79c that can include wheels that will allow the apparatus 70 to be moved into a predetermined position by, for example, rolling the apparatus into a predetermined position.

FIG. 6 further illustrates present aspects that include the ability for an operator to not only provide upward and/or downward force to the part that will, in turn, be sensed by force sensor 76 but, by applying rotational force, or torque (as shown by arrows "A"), or an angularly pivoting force (as shown by arrows "B") to the part and, in turn, the force sensor 76, or that is sensed by additional dedicated rotational force or pivoting force sensors (not shown), the apparatus can comply with the operator's supplied rotational and/or angularly pivoting force desires and touch "commands" imparted to the part. The apparatus then "complies" with the predetermined directional or other movement supplied by an operator, by rotating and/or angularly pivoting for the purpose of placing, for example, a large part, into a precise orientation and/or location that can facilitate installation of the large part into an assembly, while maintaining the large part at essentially zero-G, and making the part feel essentially weightless to an operator, as the part's orientation and position are controlled, manipulated, maneuvered, etc., in a zero-G condition.

The apparatuses, systems, and methods, according to present aspects, can be used and are particularly advantageous for the installation and/or removal and/or rework of large parts and/or sub-assemblies into or from larger assemblies, especially assemblies comprising installation positions that are located beneath large structures. As shown in FIG. 7, an aircraft wing 100, comprising an engine 102 located beneath wing 100 that requires part installation during manufacturing, inspection, rework, in-service maintenance, etc. can employ the apparatuses, systems and methods described herein through the use of the zero-G lifting apparatus 104 that can be maneuvered into position beneath wing 100. According to present aspects, the installation of large parts by providing a zero-G condition to such parts, especially in a restricted space environment (e.g., beneath large fixed structures, etc.) greatly facilitates manipulating, orienting, positioning, installing, removing, reworking, etc. such parts from larger assemblies.

In addition, while the present aspects illustrate and describe use of a drive mechanism in the form of a screw drive mechanism, other drive mechanisms can be included in the present apparatuses, systems, and methods such as, for example, at least one of: a scissor-lift mechanism, a magnetic drive mechanism, a pully system, a rack-and-pinion mechanism, a pneumatic system, a hydraulic mechanism, or combinations thereof, etc. Similarly, the controllers, sensors, and accompanying programs, software, and hardware used to send signals, receive signals, interpret signals, calculate data from signals, as well as readout displays, and other supporting systems are not limited to those described herein.

FIG. 8 is a flowchart outlining a method 200 according to a present aspect including supporting 202 a part onto a zero-G positioning device, with the zero-G positioning device including: a weight measurement mechanism in communication with the part; a force sensor in communication with a support; a controller in communication with the force sensor, and the controller further in communication with the weight measurement mechanism; a drive mechanism in communication with the controller, and the drive mechanism further in communication with the force sensor. The method further includes providing 204 a countering force to the part; establishing 206 a zero-G condition on the part; applying 208 a directional force to the part; sensing 210 the directional force applied to the part; generating 212 a directional force signal; delivering 214 the directional force signal to a controller; actuating 216 the drive mechanism; and moving 218 the part at a first predetermined velocity in the direction of the directional force.

FIG. 9 is a flowchart outlining additional steps to method 200 including terminating 220 the force applied to the part; sensing 222 terminating the force; terminating 224 the force signal; terminating 226 movement of the drive mechanism; and terminating 228 movement of the part.

FIG. 10 is a flowchart outlining a method 400 according to a present aspect including sensing 402 a part location relative to an installation location; generating 404 a part location signal corresponding to a location of the part relative to the installation location, sensing 406 the part location signal to a controller, with the controller configured to control, the drive mechanism; and altering 408 the velocity of the drive from the first predetermined rate to a second predetermined rate.

According to present aspects, the zero-G condition imposed upon sizeable workpieces, parts, objects, etc. that are, for example, installed into assemblies through a lifting procedure enhances workplace safety, assists in the motion of and orientation of parts during installation into assemblies, and otherwise streamlines and improves installation, removal, reworking, and manufacturing efficiency, etc.

The present invention may, of course, be carried out in other ways than those specifically set forth herein without departing from essential characteristics of the invention. The present aspects are to be considered in all respects as illustrative and not restrictive, and all changes coming within the meaning and equivalency range of the appended claims are intended to be embraced therein.

What is claimed is:

1. A method comprising:
    supporting a part onto a zero-G positioning device;
    providing a countering force to the part;
    establishing a zero-G condition on the part;
    applying a directional force to the part;
    sensing the directional force applied to the part;
    generating a directional force signal;
    delivering the directional force signal to a controller;
    actuating the drive mechanism; and
    moving the part at a first predetermined velocity in the direction of the directional force.

2. The method of claim 1, further comprising:
    terminating the directional force applied to the part;
    sensing terminating the directional force;
    terminating the directional force signal;
    terminating movement of the drive mechanism; and
    terminating movement of the part.

3. The method of claim 1, wherein, in the step of applying a directional force to the part, the directional force applied is an upward force or a downward force.

4. The method of claim 1, wherein, in the step of applying a directional force to the part, the directional force applied is a torque.

5. The method of claim 1, wherein, in the step of applying a directional force to the part, the directional force applied is a manually applied directional force.

6. The method of claim 1, wherein the directional force applied is a force ranging up to about 20 N.

7. The method of claim 1, wherein, in the step of moving the part at a first predetermined velocity, the first predetermined velocity is less than or equal to a first maximum velocity.

8. The method of claim 1, further comprising;
    sensing a part location relative to an installation location;
    generating a part location signal corresponding to a location of the part relative to the installation location,
    sending the part location signal to a controller, said controller configured to control the drive mechanism; and
    altering the first predetermined velocity of the part to a second predetermined velocity.

9. The method of claim 1, wherein the step of moving the part at a first predetermined velocity in the direction of the directional force occurs substantially simultaneously with applying the directional force to the part.

10. Installing a part into an assembly according to the method of claim 1.

11. Installing a part into a vehicle assembly according to the method of claim 1.

12. Installing a part into an aircraft assembly according to the method of claim 1.

13. The method of claim 2, wherein the step of terminating movement of the part occurs substantially simultaneously with terminating the force.

14. The method of claim 8, wherein, in the step of altering the first predetermined velocity, the first predetermined velocity is less than or equal to a first maximum velocity.

15. The method of claim 8, wherein the step of sensing the part location relative to an installation location further comprises:
    sensing the position of the part relative to an installed part location.

16. Installing a part into an assembly according to the method of claim 8.

17. Installing a part into an aircraft assembly according to the method of claim 8.

18. An apparatus comprising:
 a support configured to support a part;
 a weight measurement mechanism configured to sense a part present on the support, said weight measurement mechanism in communication with the support;
 a force sensor in communication with the support, said force sensor configured to sense a directional force;
 a controller in communication with the force sensor, and said controller further in communication with the weight measurement mechanism;
 a drive mechanism in communication with the controller;
 wherein the weight measurement mechanism is configured to send a signal to the drive mechanism;
 wherein the apparatus is configured to provide a countering force to the part; and
 wherein the drive mechanism is configured to move the part in response to the presence of the directional force.

19. The apparatus of claim 18, wherein the countering force is configured to establish a zero-G condition on the part.

20. The apparatus of claim 18, wherein the drive mechanism is configured to comprise a screw lift mechanism.

21. The apparatus of claim 18, wherein the drive mechanism is configured to comprise at least one of: a scissor-lift mechanism; a magnetic drive mechanism, a pully system, a rack-and-pinion mechanism, a pneumatic system, a hydraulic mechanism, or combinations thereof.

22. The apparatus of claim 18, wherein the drive mechanism is configured to move a part in the direction of the directional force.

23. The apparatus of claim 18, wherein the directional force is an upward force or a downward force.

24. The apparatus of claim 18, wherein, the directional force is a torque.

25. The apparatus of claim 18, wherein the directional force is a manually applied directional force.

26. The apparatus of claim 18, wherein the directional force is a force ranging up to about 20 N.

27. The apparatus of claim 18, wherein the drive mechanism is configured to move the part in response to the directional force within a time ranging from about 0.01 to about 0.05 seconds from the time the directional force is applied to the part.

28. The apparatus of claim 18, wherein the apparatus further comprises:
 a position sensor configured to sense a part location relative to an installation location, said position sensor in communication with the controller, and said position sensor configured to send a position sensor signal to the controller.

29. The apparatus of claim 28, wherein the controller is configured to receive the position sensor signal, and wherein the controller is configured to send the position sensor signal to the drive mechanism.

30. The apparatus of claim 28, wherein the drive mechanism is configured to alter a velocity from a first drive velocity to a second drive velocity based upon the position of the part; and
 wherein, the first drive velocity comprises a velocity that is less than or equal to a first maximum velocity.

\* \* \* \* \*